United States Patent Office 3,216,830
Patented Nov. 9, 1965

3,216,830
PEANUT SPREAD AND METHOD OF MANUFACTURE
Daniel Melnick, Teaneck, N.J., assignor to Corn Products Company, New York, N.Y., a corporation of Delaware
No Drawing. Filed Mar. 18, 1963, Ser. No. 266,007
8 Claims. (Cl. 99—128)

This invention relates to a novel peanut spread of improved eating quality and improved nutritional value, particularly with reference to protein quality, and to methods of manufacture thereof.

The conventional process for making peanut butter comprises the steps of roasting shelled peanuts, cooling and blanching the peanuts, removing the nibs, hand picking the objectionable peanuts for discard, grinding the peanuts that passed inspection, mixing in the sugar and salt flavorings, and then regrinding. In making the stabilized peanut butters now on the market, a hydrogenated component described below is introduced prior to the last grinding operation. About 92.5% of the product (90–95%) is ground roasted peanuts. The protein content of conventional peanut butter is about 29% (27–32%; N×6.25) and the oil content is about 50% (48–52%).

The peanut butter of the prior art consists essentially of ground roasted peanuts and sugar (dextrose and/or sucrose) and salt flavorings. Because this product exhibits gravitational instability (oil layer separating on top of the product) it has become regular practice to add a relatively high melting fat component to the hot peanut butter (about 170° F.) sometime prior to the filling of the product into jars. This high melting fat component usually has a melting point in excess of 110° F. but less than 160° F. and may be: a partially hydrogenated fat, a completely hydrogenated fat, mono- (and di-) glyceride esters of the saturated fatty acids, or mixtures of these firming up agents. These high melting fat components, when added in small amounts (viz. 1–3% of the peanut butter), may be introduced as a supplement to the ground roasted peanuts or when added in larger amounts (viz. 5–10% of the peanut butter) may be introduced after an equivalent amount of the liquid peanut oil in the ground roasted peanuts had been removed. The added hard fat sets up as a continuous or semi-continuous stearine structure within the final peanut butter during the cooling of the product and in so doing prevents oil from separating from the peanut butter. The sugar and salt flavorings are added in peanut butter manufacture in total amount, usually less than 5%, and this addition is balanced with an equivalent addition by weight of liquid non-hydrogenated vegetable oil, or the firming up agent previously mentioned. When the latter approach is used, less of the native peanut oil has to be removed to compensate for the subsequent addition of the hard fat component. During the roasting of the peanuts, moisture content is reduced so that the final product will contain less than 4% moisture.

There are two major criticisms of conventional peanut butter, even that stabilized against oil separation. In the first place, peanut butter is sticky in the mouth and because of this is characterized as a product of poor eating quality. This defect is due to the fact that the peanut solids, particularly the protein and polysaccharide components are in essentially the dehydrated state in peanut butter. These components have a high affinity for moisture, and when the saliva in the mouth comes in contact with the peanut butter a thickened, sticky, gummy mass forms. The second major criticism of peanut butter is that the nutritive value of the original peanuts has been greatly lowered as a result of the roasting operations. The nutritional value of the protein is lowered and the magnitude of this change is related to the degree of the roasting of the peanuts. There is a marked destruction (sometimes almost complete) of thiamine (vitamin $B_1$) and significant destructions of other vitamins, viz. 76% loss of pantothenic acid and up to 24% loss of riboflavin.

Attempts have been made by others to make peanut butter a more acceptable product by introducing supplementary materials which do not contribute to stickiness of the product in the mouth. For this purpose, simple sugars have been added, such as dextrose in about 5% concentration, or partially hydrogenated fats in about 15% concentration, or combinations of sugar and fat additives. These added materials do indeed reduce the stickiness of peanut butter in the mouth but unfortunately also reduce still further the nutritive value of the peanut butter. For example, the product containing both added fat and simple sugars may contain as little as 23% protein (N×6.25) whereas conventional peanut butter contains about 29% protein. The reason for this difference is that the supplemented peanut butter contains only about 75% ground roasted peanuts in contrast to the more than 90% in most peanut butters, and the sole source of protein in the product is the ground roasted peanuts. Others have added plant materials of more than 6% moisture content and rich in enzyme (proteolytic) content and have depended upon time and enzymic hydrolyses of the protein present in the expectation of obtaining better mouthing quality. That this results in no improvement in protein nutritional value is apparent from the fact that no significant increase in protein content is attained following supplementation and more importantly the amino acid balance in the peanut protein and in the supplementary plant protein are very nearly the same; one protein cannot balance out the nutritional deficiencies in the other.

The object of the present invention is to provide, by adding certain supplementary materials to ground roasted peanuts, a peanut spread of good peanut flavor, color and body, one which is at least equal and generally superior to conventional peanut butter in eating quality, less sticky in the mouth, and at the same time markedly improved with respect to the overall protein value of the product. Another object is to improve, by the addition of certain supplements, the overall nutritional value of the product with regard to protein, vitamin, and mineral content, and at the same time improve eating quality. A further object is to provide methods for making these novel peanut spreads exhibiting both improved organoleptic qualities and nutritional value.

In my studies of the composition of the peanut, I have noted its uniqueness among the foods ingested in significant quantity by the human, in providing many nutrients in concentrated form. This legume is high in protein content, about 31% (N×6.25), dry basis, and is an excellent source of the vitamins of the B complex. About 50% of the roasted peanut consists of an edible oil rich in polyunsaturated fatty acids (about 30% of the oil being the essential fatty acid, linoleic acid) and the ratio of the polyunsaturated to the saturated fatty acids is well above 1.0 and generally above 1.3. In addition, the peanut is a good source of four of the essential minerals, phosphorus, iron, copper and manganese. As mentioned earlier, protein value is impaired and certain of the B vitamins are greatly reduced in concentration as a result of the roasting process in converting the raw peanut to its edible form in peanut butter. Certain essential nutrients are absent or present in limited amounts in the raw and roasted peanut.

I have discovered that I can overcome the disadvantages above-mentioned by introducing into the peanut spread various supplementary materials which would be a composite of nutrients. Particular attention was directed toward making the peanut spread markedly superior to conventional peanut butter as a source of protein of improved quality without reducing protein content. Secondary to this nutritional improvement was the addition of essential vitamins and minerals to provide nutritional balance in the final peanut spread. At the same time, a product of high organoleptic appeal was provided. Protein of good quality was added to balance out the nutritional deficiencies of the protein in ground roasted peanuts (lysine, threonine, and methionine being the most important of the limiting amino acids with isoleucine, leucine and valine being the minor limiting amino acids). The supplement of protein material would, of necessity, have to be of animal origin and of high quality. The animal proteins are known to be of the highest nutritional quality and best suited in amino acid composition for supplementing the proteins of plant origin to balance out the amino acid deficiencies of the latter protein. Since peanut butter has poor shelf life when moisture content is above 4%, the animal protein material would have to be added in dehydrated form.

In the early phases of my investigation, it was expected that a peanut spread of improved nutritional quality, particularly with regard to protein value, could be obtained by adding the selected nutrient supplements. However, the discovery has now been made that in adding these nutrient materials with sufficient vegetable oil, a product of improved eating quality is also obtained. This was very surprising since the total added supplement contains protein in dehydrated form in concentration equal to or much greater than that of the basic peanut butter, and the total vegetable oil added by way of the supplement is in amount not greater than that characteristic of the oil content of conventional peanut butter. One would expect these supplemented peanut butters to be generally poorer than conventional peanut butter in eating quality (greater sticking in the mouth) because protein content of the supplement is equal or much greater than that of peanut butter and the ratio of protein to oil in the supplement is generally greater than that of conventional peanut butter. However, such is not the case. The final peanut spread of my invention is generally less sticky in the mouth (better eating quality) than the conventional peanut butter and this had been noted not only by the organoleptic evaluations, but also objectively by Farinograph tests to be described hereinafter. Only through the novel method which is herein described is it possible to make a peanut spread with the appearance and flavor of conventional peanut butter but of better eating quality and markedly superior nutritional value.

The animal protein materials which I use to supplement the peanut protein in the ground roasted peanuts contain less than 5% moisture and from 30% to 90% animal protein. The dehydrated animal protein materials which I have found satisfactory for this purpose include skim milk powder containing about 35% milk proteins, lactalbumin powder containing about 80% protein, casein as sodium caseinate powder of about 90% protein content, egg albumin powder of about 85% protein content, dehydrated whole fish powder containing about 80% protein and mixtures of these protein materials. The mixtures may be those prepared by blending individual components after dehydration, or may be the fusion products obtained following dehydration of a mixed solution of the components. The animal protein materials are in powder form sufficiently reduced in particle size to pass through a 100 U.S. mesh screen, and preferably through a 200 mesh screen. These protein materials are added in an amount of about 5 to about 20 parts by weight to 100 parts of the basic peanut butter, the protein in said protein material providing an absolute quantity of about 4% to about 10%, preferably an absolute quantity of about 4% to about 7.5% of animal protein to the total protein content.

The animal protein concentration (N×6.25) in the total supplement, added to the conventional peanut butter, varies from 28 to 45 percent, and hence is about 100 to 150 percent of that of the basic peanut butter. The vegetable oil concentration in the total supplement is at least equal to the animal protein content, varying from about 30 to 52%, and hence is about 60 to 100 percent of that of the basic peanut butter. The ratio of the animal protein to oil in the supplement varies from about 0.55 to about 1.0, and hence is about 100 to 180% of that of the basic peanut butter.

The vegetable oil in the supplement added to the conventional peanut butter may be liquid, non-hydrogenated vegetable oil or hydrogenated vegetable oils, or combinations of the two. When the supplementary oil additive includes a hydrogenated component (essential when the basic peanut butter lacks such a component), this component exhibits a melting point of from 100° F. to 160° F. The hard fat in this supplement serves to stabilize the final peanut spread against oil separation. Because of the demonstrated need to add extra vegetable oils to balance off in part the non-fat components provided in significant amounts in the total supplement, it becomes unnecessary to remove any of the peanut oil from the ground roasted peanuts for subsequent replacement purposes. The vegetable oil component of the supplement can provide in itself adequate amounts of the hydrogenated component for stabilization purposes. The added vegetable oil, in non-hydrogenated and/or hydrogenated form, is any vegetable oil such as peanut, cottonseed, corn, soybean and the like. When it is desired to increase the vitamin E (alpha tocopherol) level of the peanut spread, the preferred supplementary vegetable oil is cottonseed oil.

Carbohydrate material, when added as such in the supplement, is in the form of a water-soluble sugar, added to the peanut butter containing the usual sugar and salt flavorings.

The peanut spread of the present invention contains less than 4% moisture and consists of from 10 to 55 parts of supplementary material added to 100 parts of conventional peanut butter, the ratio of animal protein to oil in the supplementary material varying from about 0.55 to about 1.0. The peanut spread contains from 60% to 85% of ground, blanched, roasted peanuts. There is present in this spread an absolute quantity of about 4% to about 10% of high-quality animal protein, from about 13% to about 35% of the total protein present. Total protein (N×6.25) content varies from about 27% to about 32%. The novel peanut spread contains about 43% to about 51% of vegetable oil. Thus, the peanut spread has a protein content which is not less than that of conventional peanut butter and an oil content which is not more than that of conventional peanut butter. The novel peanut spread is distinguished over prior art products in providing a product of high peanut flavor which is at least as good as conventional peanut butter in eating quality but markedly superior in protein nutritional value.

Preferably the supplementary material is added in amount of from 10 to 30 parts to 100 parts of conventional peanut butter, so that the final spread contains from 70% to 85% of ground blanched, roasted peanuts. The preferred peanut spread contains an absolute quantity of about 4% to about 7.5% of high-quality animal protein, from about 13% to about 25% of the total protein present. In the preferred products of this invention, eating quality is also improved, less stickiness in the mouth than conventional peanut butter.

In some special modifications of the preferred peanut spreads of the present invention, I have introduced additional nutrients into the supplementary material in order to make the peanut spread in itself a nearly perfect food. Since peanut butter is a breadspread and in this capacity substitutes for butter and margarine, I have added vitamins A and D to my special peanut spreads in comparable concentrations. Vitamin E (alpha tocopherol) and the essential fatty acids (linoleic acid) have been provided by the native peanut and the cottonseed oil added by way of the supplement; ratio of linoleic to saturated fatty acids in the peanut spreads of this invention have been well above 1.0 and generally above 1.3. Since raw peanuts contain about 1.0 mg. of thiamine per 100 grams and this vitamin is largely destroyed in the roasting process, I have added back sufficient thiamine to bring the vitamin $B_1$ content to 1.0 mg. per 100 grams (also the minimal adult daily requirement for thiamine) of my special peanut spread. The other B vitamins, vitamin $B_2$ (riboflavin), vitamin $B_6$ (pyridoxine), vitamin $B_{12}$ (cyanocobalamin), and calcium pantothenate have been added to my special peanut spread in quantities as required to effect nutritional balance with respect to daily requirements or reasonable approximations thereof. No supplementation with niacin has been required since the peanut is one of the richest sources of this essential heat-stable nutrient. With respect to the other vitamins of the B-complex, biotin, folacin, choline, and inositol—those which as yet have not been shown to be required in human nutrition, no additions have been made; I depend in each case upon that natural to the food ingredients I have employed in making my special peanut spread. Vitamin C (ascorbic acid) has been added to this product in order to round out the nutritional picture, both qualitatively and quantitatively, with respect to vitamins furnished. Peanut butter is deficient in calcium but rich in phosphorus, an unsatisfactory situation from the nutritional standpoint since a poor calcium: phosphorus ratio results. This consideration has led me to add a calcium salt containing no phosphorus (calcium carbonate) to my special peanut spread, in order to make the calcium:phosphorus ratio optimal, i.e., equal to 1.0, essentially the same as that found in milk. With respect to the minerals—iron, copper, and manganese—required for blood (hemoglobin) formation, peanut butter per se rates as a fairly good source. Since the salts of these minerals are known to be pro-oxidant catalysts, I have considerd it not advisable to supplement my special peanut spread with them. Iodine may be supplied, if desired, in the form of iodized salt addd during formulation. I have also established that the peanut spreads of the present invention are excellent media for the uniform distribution of the added essential nutrients and for providing them in relatively stable form throughout the shelf life of the product, viz. 5 months at room temperature.

The peanut spreads of the present invention were rated for organoleptic qualities versus conventional peanut butters; i.e. color, flavor, body and eating quality. Because of the criticality and importance of the latter measurement, an objective procedure was desired for that purpose. A Farinograph method was developed and is described herewith.

The Farinograph and its applicability to the measurement of flour dough consistency is described by E. J. Pyler in "Baking Science and Technology," volume II, pp. 511–516 (1952), Siebel Publishing Co., Chicago, Illinois. The force required to rotate the paddle blades, operating at constant speed, through a dough held at a constant temperature, is continuosuly recorded versus time to obtain a chart known as a Farinogram.

In the Farinograph bowl at 27° C. are added 300 grams (approx. 90 gm. protein) of the peanut spread at 27° C. followed by 125 ml. of distilled water also at 27° C. A 4040 gram stainless steel block, which just fits within the walls of the bowl, is placed upon the mixture, the top surface of the block being flush with the top of the bowl and the bottom surface of the block clearing the mixing paddles by about 5 mm. The Farinogram is taken when the mixer is operating at 30 r.p.m. The instrument is employed at the maximum sensitivity setting with the damper open. The area is square inches under the Farinogram curve from the point of uniform absorption of the water, usually after the first 2 to 2.5 minutes until the end of the 15 minute mixing period, is a measure of the stickiness or eating quality of the peanut spread. The decrease in area between the spreads of this invention and conventional peanut butter is the measure of the improvement in eating quality; it is recorded as a plus figure. An increase in area between spreads, not encompassed by this invention, and conventional peanut butter is the measure of the impairment in eating quality (greater stickiness); it is recorded as a minus figure. Good correlation exists between the above interpretations of the Farinograms and eating quality, when the latter is subjectively evaluated by trained scorers.

In the present study, protein nutritional value was established by controlled rat feeding studies, employing the procedure described by Chapman et al. (Can. J. Biochem., 37, 679 (1959). All diets provided weanling male albino rats, for a period of 28 days, 10% protein ($N \times 625$) in an otherwise nutritionally adequate diet. Body weight and food intake were recorded weekly. In some tests blood hemoglobin levels were determined at the end of the 4-week test period. The efficiency of food utilization was calculated from the gram gain in body weight per 100 grams food eaten; and protein efficiency ratio was calculated from the gram gain in body weight per gram protein eaten. Overall protein value was obtained by multiplying the protein efficiency ratio by the percent of protein in the food being tested. A modification of above procedure was used in determining the value of the proteins in the peanut spread of this invention in supplementing the proteins of standard white bread. The protein value of the latter product is known to be low; not only is protein content low (about 9%), but so also is protein quality. The protein efficiency ratio of the protein in standard white bread has been reported to average 0.74, ranging from 0.56–1.01 (Friedman, J. Am. Diet. Assoc., 35, 574 (1959)).

For the purpose of defining the scope of the present invention I have expressed the composition of the novel peanut spread always in parts per weight in relation to 100 parts of conventional peanut butter (or the basic peanut butter). At times it is desirable to make the peanut spread by adding the supplementary material to conventional peanut butter. At other times, it is desirable to make the novel peanut spread directly with the individual ingredients. Under the latter circumstances, the ground roasted peanuts and appropriate quantities of sugar and salt flavorings and of balancing oil are grouped together for purpose of calculations to provide the basic conventional peanut butter, leaving all other ingredients as a group to be the supplementary material. As the best single series of values for the composition of average conventional peanut butter, I have used 92.56 parts of ground, blanched roasted peanuts, 3.72 parts of sugar and salt flavorings, and 3.72 parts of peanut oil.

The examples which follow provide a more detailed description of the present invention. Obviously, many modifications are available to those skilled in the art and this invention is limited only by the appended claims.

EXAMPLE 1

This is an example of a preferred peanut spread of the special type. The added vitamins and minerals are of no import in the bioassays for protein quality since the basal protein-free diet furnished all essential nutrients in ample quantity. Only in the assay of the peanut-spread sandwich as the sole food consumed are the supplementary vitamins and minerals of importance. The total quantity of vitamins and minerals is so small, less than 1% of the product, that these exert no influence on the eating quality of the peanut spread.

The following is the composition of the example.

| Ingredient: | Parts by weight |
|---|---|
| Peanuts, roasted, blanched and ground | 74.60 |
| Blend of vegetable oils [1] | 9.50 |
| Non-fat dry milk solids (200 mesh; 35.6% protein) | 10.00 |
| Lactalbumin product (200 mesh; 78.0% protein) | 2.66 |

| Ingredients: | Parts by weight |
|---|---|
| Flour salt | 1.40 |
| Dextrose powder | 1.12 |
| Sucrose (confectioners', 6X) | 0.13 |
| Calcium carbonate powder, precipitated, USP | 0.55 |
| Vitamin A palmitate concentrate [2] | 0.0076 |
| Vitamin D$_2$ (calciferol) concentrate [3] | 0.0014 |
| Thiamine mononitrate (vitamin B$_1$) | 0.0010 |
| Riboflavin (vitamin B$_2$) | 0.0011 |
| Pyridoxine hydrochloride (vitamin B$_6$) | 0.0010 |
| Calcium d-pantothenate | 0.0025 |
| Cyanocobalamin (vitamin B$_{12}$) concentrate [4] | 0.0030 |
| Ascorbic acid (vitamin C) | 0.0300 |

[1] Consisting of 3.0 parts of non-hydrogenated cottonseed oil; 5.0 parts of a partially hydrogenated vegetable oil such as hydrogenated cottonseed oil of 106° F. melting point (Wiley) and having S.C.I. values (solid content index) of about 50 at 50° F., about 35 at 70° F., about 28 at 80° F. and about 13 at 92° F., and 1.5 parts of a completely hydrogenated cottonseed oil of 140° F. melting point.
[2] A corn oil solution containing 500,000 USP units of vitamin A per gram.
[3] A corn oil solution containing 400,000 USP units of vitamin D per gram.
[4] An 0.1% trituration of the vitamin with mannitol.

The above composition, containing less than 4% moisture, is equivalent to the addition of 24.1 parts of supplementary material to 100 parts of average conventional peanut butter; the animal protein material (the non-fat skim milk solids and the lactalbumin product) is present in the amount of 15.7 parts by weight to 100 parts of the basic peanut butter.

The peanuts are roasted in an atmosphere of 400° F. to a slight over-roast in color and flavor and to a moisture content of 1.5%. After having been cooled by air blown over them for about 10 minutes, the peanuts at about 100° F. are blanched for removal of the skins and nibs. Defective nuts are eliminated by hand-picking. The peanuts are subjected to an initial grinding. To the peanut paste now at a temperature of about 140° F. are added the blend of vegetable oils at 150° F. and containing the just-added vitamins A and D. After mixing the above for a period of about 10 minutes, a uniform blend of the remaining dry ingredients is gradually added with mixing. The total mix is now blended for a period of about 20 minutes while maintaining product temperature at about 140° F. The mix is given a second and final grind reducing the peanut particle size to such a degree that 95 to 97% will pass through a 200 mesh screen. The peanut spread at about 165° F. is transferred to a deaeration kettle and held under vacuum with mild agitation for about one hour. Product temperture is then lowered to about 120° F. and the spread quickly chilled through a heat exchanger (viz. a votator heat exchanger) to a temperature of about 85° F. The peanut spread is transferred to a second deaeration kettle and mildly agitated for a period of 10 minutes and then packed in glass jars and capped. The product is stored at room temperature (about 75° F.).

Comparison of the product of Example 1 was made with an average conventional peanut butter (control *a*) and with a commercially available peanut spread (control *b*) containing partially hydrogenated fat in about 13% concentration and sugars in about 5% concentration. The latter product was designed simply to be an improvement on the eating quality of peanut butter. In color all three products were of good quality. When evaluated over a temperature range of 45° F. to 95° F., the product of Example 1 was found to exhibit the least change in its desirable body, while the conventional peanut butter showed the narrowest plasticity range under the conditions of test. In flavor scoring of fresh and aged product by an expert panel, the peanut spread of Example 1 was found to be comparable to that of the conventional peanut butter and significantly more desirable (more peanut flavor) than the prior art peanut spread. In eating quality, the prior art peanut spread was less sticky in the mouth; indeed, to such a degree that peanut flavor was actually masked. Surprisingly, the product of Example 1 was definitely less sticky in the mouth than the conventional peanut butter, and this was noted without impairment in intensity of peanut flavor. In Table I are presented the results of the Farinograms obtained in measuring objectively the eating qualities of the three products; these values confirm the subjective scorings. With the prior art peanut spread, control *b* the viscosity curve is very low under the standardized conditions of the Farinograph test. Accordingly, the sample size was increased in amount to provide the same quantity of protein as in the other two tests and it is this Farinogram which is indicated in Table I.

*Table I*

IMPROVEMENT IN THE EATING QUALITY AND PROTEIN NUTRITIONAL VALUE AS A RESULT OF THE PRESENT INVENTION

| | Composition of product | | | Composition of supplement | | | Area under curve, sq. in.[1] | Improvement in eating quality, sq. in.[2] | Animal protein in product, percent |
|---|---|---|---|---|---|---|---|---|---|
| | Protein, percent | Oil, percent | Ratio | Protein, percent | Oil, percent | Ratio | | | |
| Control (*a*)—conventional peanut butter | 29.1 | 49.6 | 0.59 | | | | 22.0 | | 0.0 |
| Control (*b*)—prior art peanut spread; fat and carbohydrate supplement of conventional peanut butter | 22.9 | 54.8 | 0.42 | 0.0 | 63.6 | 0.0 | 13.6 | +8.4 | 0.0 |
| Example 1—peanut spread: protein and other nutrient supplement of conventional peanut butter | 30.0 | 44.4 | 0.68 | 29.1 | 33.6 | 0.87 | 17.0 | +5.0 | 5.6 |

[1] The area in square inches under the Farinograph curve using the standardized Farinograph procedure following the controlled addition of water to peanut spread as described in the specification.
[2] Decrease in area under the Farinograph curve, resulting from decrease in viscosity (stickiness) during test period, following comparison with the area under the curve for the conventional butter (control *a*).

In Table I there are summarized the findings obtained in testing the three products for composition, for improvement in eating quality, and for protein nutritional value. Objective determinations of improvements of eating qualities of control (*b*) or Example 1 as compared with control (*a*), is obtained by calculating the decrease in area under these curves when compared with area in square inches under the Farinograph curve of the conventional peanut butter (control *a*). It will be noted that the significant improvement in eating quality of the product of Example 1 was attained despite the fact that the protein content of the supplementary material was not less than that of the conventional peanut butter and the ratio of protein to oil in the supplement was even much greater than that in the conventional peanut butter. The product of Example 1 contained protein in slightly greater amount than that in the conventional peanut butter, while the protein content of the prior art peanut spread was very low due to dilution of the basic peanut butter with supplementary material containing no protein whatsoever. Furthermore, supplementary material in the product of Example 1 contributed an absolute quantity of 5.6% of high-quality animal protein to the total peanut spread, 18.7% of the total protein content, a contribution expected to make a significant improvement in the protein nutritional value of peanut butter.

In Table II there are summarized the results of the first series of biological assays of the protein value of the prior art products (the controls) and the product of Example 1. It will be noted that the animals on the diet containing the product of this invention exhibited growth about 80% better than that on the diets containing the prior art products.

In overall protein value, the proteins provided by the peanut spread sandwich (Example 1) averaged out to be 50% better than the proteins in the conventional peanut butter sandwich, and the same as the proteins in the cheese sandwich. The prior art peanut spread was not included in this study.

Table III
DEMONSTRATED IMPROVEMENT IN PROTEIN NUTRITIONAL VALUE AS A RESULT OF THE PRESENT INVENTION—VALUE OF PRODUCT WHEN FED ALONG WITH STANDARD WHITE BREAD [1]

| Test [2] | Lower Feeding Level | | | Higher Feeding Level | | |
|---|---|---|---|---|---|---|
| | Control (a)—Conventional peanut butter | Example 1—Peanut spread | Composite of cheese spreads [3] | Control (a)—Conventional peanut butter | Example 1—Peanut spread | Composite of cheese spreads [3] |
| Level of protein in diet, percent | 10.55 | 9.82 | 7.12 | 15.02 | 14.69 | 10.35 |
| Avg. weight gain, gm | 31.8 | 57.1 | 52.3 | 57.1 | 110.0 | 92.4 |
| Efficiency of food utilization | 13.2 | 19.3 | 18.4 | 22.7 | 30.9 | 30.1 |
| Protein efficiency ratio | 1.26 | 1.96 | 2.58 | 1.52 | 2.10 | 2.91 |
| Overall protein value | 26.4 | 42.1 | 41.6 | 31.9 | 45.1 | 46.8 |

[1] In each case, one ounce of each type of spread combined with two slices of standard white bread was considered to be a sandwich; this is equivalent to a mixture of 53.7% of air-dried bread crumbs and 46.3% of spread. The protein content of the three respective product mixtures were 20.95%, 21.46%, and 16.10%. At each feeding level, the protein percentages in the diet are about in the same relation to each other as they are in the respective product mixtures.
[2] See specification for explanation of nutritional indices.
[3] Selected for high protein content; composite of the three types contained 18.93% protein (N×6.25), all as milk proteins.

Table II
DEMONSTRATED IMPROVEMENT IN PROTEIN NUTRITIONAL VALUE AS A RESULT OF THE PRESENT INVENTION

| Test [1] | Control (a)—Conventional peanut butter | Control (b)—Prior art peanut spread | Example 1—Peanut spread |
|---|---|---|---|
| Protein content, percent | 29.1 | 22.9 | 30.0 |
| Level of protein in diet, percent | 10.56 | 10.50 | 10.25 |
| Avg. weight gain, gm | 26.6 | 27.1 | 48.9 |
| Avg. hemoglobin value, gm. percent | 11.1 | 10.8 | 12.2 |
| Efficiency of food utilization | 14.7 | 14.6 | 21.0 |
| Protein efficiency ratio | 1.39 | 1.39 | 2.05 |
| Overall protein value | 40.4 | 31.8 | 61.5 |

[1] See specification for explanation of nutritional indices.

Since the basal diet provided all nutrients in ample supply other than protein, the higher hemoglobin value of the rats fed Example 1 is another index of superior protein value. In efficiency of food utilization and in the protein efficiency ratio, there was somewhat more than a 40% improvement effected by Example 1. Because of the higher protein content and higher protein efficiency ration of Example 1, the overall protein value of Example 1 was 52% better than that of the conventional peanut butter and 93% better than that of the prior art peanut spread.

The value of the product of Example 1 as a supplement to standard white bread (ratio of combination being that found in a sandwich) is shown by the biological findings summarized in Table III. It will be noted that, at the two feeding levels, Example 1 in "sandwich form" was markedly superior to the conventional peanut butter and practically the equal of the cheese according to all nutritional indices. The proteins in the cheese composite were all milk protein of recognized high nutritional value.

In Table IV there are summarized the results showing that one of my preferred products of the special type (Example 1) is almost the perfect food. Here comparison is made between results obtained in feeding a well-balanced adequate diet and in feeding the product of Example 1 along with standard white bread, in ratio simulating a sandwich, as the sole diet. It will be noted that according to all nutritional indices, Example 1 in "sandwich form" was in itself almost equal to a conventional well-balanced adequate diet providing meat, milk, grain components and vitamin supplements.

Table IV
EXTRAORDINARY NUTRITIONAL VALUE OF THE PRODUCT OF EXAMPLE 1 WHEN FED ALONG WITH STANDARD WHITE BREAD AS THE SOLE DIET

| Test [1] | Well-balanced adequate diet [2] | Example 1—Peanut spread in sandwich form [3] |
|---|---|---|
| Protein content, percent | 21.5 | 22.0 |
| Avg. weight gain, gm | 165.0 | 142.2 |
| Avg. hemoglobin value, gm. percent | 12.5 | 12.2 |
| Efficiency of food utilization | 47.5 | 44.2 |
| Protein efficiency ratio | 2.21 | 2.01 |
| Overall protein value | 47.5 | 44.2 |

[1] See specification for explanation of the nutritional indices.
[2] Ration resembling the food consumption pattern of the U.S. population with respect to meat, milk, and grain components; vitamin supplements were added (Oser et al., J. Nutrition 60, 367 (1956)).
[3] Ration of Peanut Spread of Example 1 and standard white bread (in air-dried crumb form) in the proper ratio of one to another to provide a typical sandwich.

In comparing the responses of the rats, as summarized in Tables II–IV, to diets containing the product of Example 1, progressively greater rate of growth and better efficiency of food utilization values were obtained as the percent protein in the test diets increased. In terms of protein efficiency ratio which takes into consideration quantity of protein ingested, the biological responses to Example 1 were essentially the same throughout the studies.

EXAMPLE 2

Into 100 parts of a conventional high-roast peanut butter (control c), of the composition described earlier in this specification and containing a hydrogenated fat stabilizer, was gradually stirred a mixture of 6.4 parts of a lactalbumin product (200 mesh; 78.0% protein) and 6.4 parts of peanut oil. The mixture at about 80° F. was gently stirred under vacuum for about 5 minutes to obtain a uniform product. It was then packed in glass jars. This example, one of the preferred products, was compared with a product made with the same ingredients, but omitting the extra peanut oil, and with the original peanut butter similarly stirred. All three products contained less than 4% moisture. The product of Example 2 was made by the addition of 12.8 parts by weight of supplementary material to 100 parts of the peanut butter, the animal protein material (the lactalbumin product) being present in the amount of 6.4 parts to 100 parts of the basic peanut butter. In color, flavor and body, all three products were good. The lactalbumin-supplemented product without the added peanut oil was definitely poorer in eating quality, poorer than the basic peanut butter, while the product of Example 2 was definitely superior in this respect to the basic peanut butter. Table V which summarizes the pertinent findings with Example 2 and the others to follow, will be discussed after the description of all the subsequent examples.

EXAMPLE 4

To 100 parts of the same basic peanut butter, used in Example 2, was added a mixture of 6.4 parts of the same lactalbumin product, 2.2 parts of lactose and 8.6 parts of peanut oil. The method employed in making the final spread was the same as that described in Example 2. The product of Example 4 another one of the preferred products was made by the addition of 17.2 parts by weight of supplementary material to 100 parts of the peanut butter the animal protein material being present in the amount of 6.4 parts to 100 parts of the basic peanut butter. The product of Example 4 was the same in body as the product of Example 2 but slightly lower in peanut flavor and color; however it was slightly better in eating quality.

EXAMPLE 5

To 100 parts of the same basic peanut butter used in Example 2 was added a mixture of 19.5 parts of the same lactalbumin product 6.8 parts of lactose and 26.3 parts of peanut oil. The method employed in making the final spread was the same as that described in Example 2. The product of Example 5, a less preferred product, was made by the addition of 52.6 parts of supplementary material to 100 parts of the peanut butter, the animal protein material being present in the amount of 19.5 parts to 100 parts of the basic peanut butter. The product of Example 5 was softer in body and lower in peanut flavor and color

*Table V*

CRITICAL STUDY OF FACTORS RESPONSIBLE FOR IMPROVEMENT IN THE EATING QUALITY AND PROTEIN NUTRITIONAL VALUE OF THE PEANUT SPREADS OF THE PRESENT INVENTION

| Product | Composition of product | | | Composition of supplement | | | Improvement in eating quality,[1] sq. in. | Animal protein in product, percent |
|---|---|---|---|---|---|---|---|---|
| | Protein, percent | Oil, percent | Ratio | Protein, percent | Oil, percent | Ratio | | |
| Control (c)—Conventional peanut butter | 29.0 | 50.0 | 0.58 | | | | | 0.0 |
| Control (c)+lactalbumin; parts, 100.0+6.4 | 31.9 | 46.8 | 0.68 | 78.0 | 0.0 | ∞ | −4.6 | 4.7 |
| Example 2—Control (c)+latalbumin+peanut oil; parts, 100.0+6.4+6.4 | 30.2 | 50.0 | 0.60 | 39.0 | 50.0 | 0.78 | +3.2 | 4.4 |
| Example 3—Control (c)+lactalbumin+lactose+peanut oil; parts, 100.0+6.4+5.0+5.0 | 29.2 | 47.2 | 0.62 | 30.5 | 30.5 | 1.00 | +3.2 | 4.3 |
| Example 4—Control (c)+lactalbumin+lactose+peanut oil; parts, 100.0+6.4+2.2+8.6 | 29.0 | 50.0 | 0.58 | 29.1 | 50.0 | 0.58 | +5.2 | 4.3 |
| Example 5—Control (c)+lactalbumin+lactose+peanut oil; parts, 100.0+19.5+6.8+26.3 | 29.0 | 50.0 | 0.58 | 29.0 | 50.0 | 0.58 | +10.7 | 10.0 |
| Example 6—Control (c)+egg albumin+peanut oil; parts, 100.0+5.8+5.8 | 30.5 | 50.0 | 0.61 | 43.0 | 50.0 | 0.86 | +6.9 | 4.5 |
| Control (d)—Conventional peanut butter | 29.0 | 50.0 | 0.58 | | | | | 0.0 |
| Control (d)—Casein; parts, 100.0+5.6 | 32.3 | 47.4 | 0.68 | 90.0 | 0.0 | ∞ | −6.5 | 4.7 |
| Example 7—Control (d)+casein+peanut oil; parts, 100.0+5.6+5.6 | 30.6 | 50.0 | 0.61 | 45.0 | 50.0 | 0.90 | 0.0 | 4.5 |
| Example 8—Control (d)+casein+lactose+peanut oil; parts, 100.0+5.6+5.0+5.0 | 29.4 | 47.6 | 0.62 | 32.3 | 32.0 | 1.01 | −0.7 | 4.4 |
| Example 9—Control (d)+casein+lactose+peanut oil; parts, 100.0+16.9+9.4+26.3 | 29.0 | 50.0 | 0.58 | 29.0 | 50.0 | 0.58 | +0.1 | 10.0 |
| Control (d)+Ca-Sal; parts, 100.0+5.9 | 32.1 | 47.2 | 0.68 | 85.0 | 0.0 | ∞ | −7.6 | 4.7 |
| Control (d)+Ca-Sal; parts, 100.0+11.8 | 34.9 | 44.7 | 0.78 | 85.0 | 0.0 | ∞ | <−17.0 | 9.0 |
| Example 10—Control (d)+Ca-Sal+lactose+peanut oil; parts, 100.0+18.0+8.3+26.3 | 29.0 | 50.0 | 0.58 | 29.1 | 50.0 | 0.58 | +5.7 | 10.0 |

[1] Decrease in viscosity using the standardized Farinograph procedure following the controlled addition of water to peanut spread as described in the specification; viscosity (stickiness) is measured as the area, in square inches, under the Farinograph curve and the change recorded above is the decrease following comparison with the area under the curve for the conventional peanut butter (control (c) or (d)).

EXAMPLE 3

To 100 parts of the same basic peanut butter, used in Example 2, was added a mixture of 6.4 parts of the same lactalbumin product, 5.0 parts of lactose and 5.0 parts of peanut oil. The method employed in making the final spread was the same as that described under Example 2. The product of Example 3, another one of the preferred products, was made by the addition of 16.4 parts by weight of supplementary material to 100 parts of the peanut butter, the animal protein material being present in the amount of 6.4 parts to 100 parts of the basic peanut butter. The product of Example 3 was comparable in all properties to the product of Example 2.

when compared to the product of Example 2, but still acceptable. In the mouth it was definitely less sticky than that of Example 2; the improvement in eating quality was almost overdone, since it differed so strikingly from what the consumer has been led to expect in a peanut butter.

EXAMPLE 6

This spread, one of the preferred products, was similar to that of Example 2 but differed in that egg albumin of 86.2% protein content was added in place of the lactalbumin product to supply 5 parts of high-quality animal protein to 100 parts of the same basic peanut butter. The egg albumin addition was paired off with a like addition by weight (5.8 parts) of peanut oil. Method of manufacture was the same as in Example 2. The product of Example 6 was made by the addition of 11.6 parts of supplementary material to 100 parts of the peanut butter, the animal protein material being present in the amount of 5.8 parts to 100 parts of the basic peanut butter. The product of Example 6 was like the product of Example 2 in all respects but somewhat better in eating quality.

EXAMPLE 7

To 100 parts of another lot of the basic peanut butter of high roast was added a mixture of 5.6 parts of sodium caseinate powder (90.0% protein content) and 5.6 parts of peanut oil. This product simulated that of Examples 2 and 6 in providing 5 parts of high-quality animal protein to 100 parts of the basic peanut butter and providing peanut oil to balance off the caseinate addition. Method of manufacture was the same as in Example 2. The product of Example 7 was like Examples 2 and 6 in all respects, except in eating quality where it was the same as the basic peanut butter. This example was one of the less preferred spreads. The product made without the peanut oil addition was totally unacceptable because of poor eating quality.

EXAMPLE 8

To 100 parts of the same basic peanut butter, used in Example 7, was added a mixture of 5.6 parts of the sodium caseinate, 5.0 parts of lactose and 5.0 parts of peanut oil. Method of manufacture was the same as described in Example 2. The product of Example 8 was like that of Example 7 in all respects; it was one of the less preferred products.

EXAMPLE 9

To 100 parts of the same basic peanut butter, used in Example 7, was added a mixture of 16.9 parts of sodium caseinate, 9.4 parts of lactose, and 26.3 parts of peanut oil. Method of manufacture was the same as described in Example 2. The product of Example 9, a less preferred product, was softer in body and lower in peanut flavor and color when compared to the basic peanut butter, but still acceptable. It was very much improved in eating quality but almost to an excessive degree.

EXAMPLE 10

To 100 parts of the same basic peanut butter, used in Example 7, was added a mixture of 18.0 parts of a casein-lactalbumin fusion product (Ca-Sal of 200 mesh, 85% protein content, obtained from Crest Food Products, Ashton, Ill.), 8.3 parts of lactose and 26.3 parts of peanut oil. Method of manufacture was the same as described in Example 2. The product of Example 10, a less preferred product, was softer in body and lower in peanut flavor and color when compared to the basic peanut butter, but still acceptable. It was definitely improved in eating quality to a desirable degree. Control reference products were made with lesser amounts of the Ca-Sal material but without the peanut oil supplement, 5.9 and 11.8 parts of Ca-Sal (equivalent to 5.0 and 10.0 parts of animal protein) added to 100 parts of the same basic peanut butter. These products were totally unacceptable on the basis of marked impairment in eating quality (extreme stickiness in the mouth). A modification of Example 10 was made but this time the hydrogenated fat stabilizer present in the basic peanut butter was now added in equivalent amount in place of part of the peanut oil in the total supplementary material. Eating quality of the product of this modified Example 10 remained essentially the same.

In Table V there are summarized the findings obtained with Examples 2–10 and the corresponding control and reference systems with respect to composition of the products themselves, composition of the supplementary material, improvement in eating quality as shown by the objective Farinograph procedure, and improvement in protein nutritional value as shown by the absolute percent of animal protein in each of the products. The animal proteins included in Examples 2–10 are all recognized to be of very high quality, of the same type as the animal proteins in Example 1. The results of the intensive biological studies with Example 1, containing 30.0% total protein of which 5.6% (absolute) was animal protein, indicate that the products of the present invention, providing a like amount of protein but with about 4% to about 10% (absolute) of the total protein being animal protein of high quality, are all markedly superior in protein nutritional value to conventional peanut butter which provides no animal protein whatsoever.

The need to add vegetable oil to balance off, at least in part, the animal protein material added to the peanut butter is apparent from the results shown in Table V. Without the vegetable oil in the supplement, eating quality is much poorer than that noted with the conventional peanut butter. With the vegetable oil in the supplement, eating quality is at least equal to that of the conventional peanut butter and definitely superior in the case of the preferred products. This is most surprising since the supplementary material I have used, provides protein in dehydrated form in concentration equal to or much greater than that of the basic peanut butter, and provides vegetable oil in amount not greater than that of the basic peanut butter. Even with a ratio of protein to oil in the supplement very much greater than that in the basic peanut butter, marked improvement in eating quality is obtained. My objective of providing a spread of good peanut flavor, color and body, one which is at least equal and preferably superior to conventional peanut butter in eating quality (less sticky in the mouth) and at the same time markedly improved in protein nutritional value, has been attained.

I claim:

1. A peanut spread containing less than 4% moisture, about 27% to 32% protein, about 43% to about 51% oil, at least equivalent to conventional peanut butter in eating quality, and of improved protein nutritional value, consisting essentially of 100 parts by weight of conventional peanut butter plus 10 to 55 parts of a supplementary material, the latter providing an absolute quantity of about 4% to about 10% of high-quality animal protein to the total protein of the spread, the ratio of animal protein to oil in the supplementary material varying from about 0.55 to about 1.0, said peanut spread containing 60% to 85% of ground, blanched, roasted peanuts.

2. A peanut spread containing less than 4% moisture, about 27% to about 32% protein, about 43% to about 51% oil, of improved eating quality and of improved protein nutritional value, consisting essentially of 100 parts by weight of conventional peanut butter plus 10 to 30 parts of a supplementary material, the latter providing an absolute quantity of about 4% to about 7.5% of high-quality animal protein to the total protein of the spread, the ratio of animal protein to oil in the supplementary material varying from about 0.55 to about 1.0, said peanut spread containing 70% to 85% of ground, blanched, roasted peanuts.

3. A peanut spread containing less than 4% moisture, about 27% to about 32% protein, about 43% to about 51% oil, at least equivalent to conventional peanut butter in eating quality, and of improved protein nutritional value, said peanut spread being made by adding to 100 parts by weight of conventional peanut butter 10 to 55 parts of a supplementary material wherein high-quality animal protein content is from about 28% to about 45%, oil content is from about 30% to about 52%, and the ratio of the animal protein to oil content in said supplementary material is from about 0.55 to about 1.0.

4. A peanut spread containing less than 4% moisture, about 27% to about 32% protein, about 43% to about 51% oil, of improved eating quality and of improved nutritional value, said peanut spread being made by adding to 100 parts by weight of conventional peanut butter 10 to 30 parts of a supplementary material wherein high-quality animal protein content is from about 28% to about 45%, oil content is from about 30% to about 52%, and the ratio of the animal protein to oil content in said supplementary material is from about 0.55 to about 1.0.

5. A peanut spread containing less than 4% moisture, about 27% to about 32% protein, about 43% to about 51% oil, at least equivalent to conventional peanut butter in eating quality, and of improved protein nutritional value, said peanut spread being made by adding to 100 parts by weight of conventional peanut butter 10 to 55 parts of a supplementary material wherein high-quality animal protein content is from about 28% to about 45%, oil content is from about 30% to about 52%, and the ratio of the animal protein to oil content in said supplementary material is from about 0.55 to about 1.0, said supplementary material providing an absolute quantity of about 4% to about 10% of the animal protein to the total protein in the spread.

6. A peanut spread containing less than 4% moisture, about 27% to about 32% protein, about 43% to about 51% oil, of improved eating quality and of improved protein nutritional value, said peanut spread being made by adding to 100 parts by weight of conventional peanut butter 10 to 30 parts of a supplementary material wherein high-quality animal protein content is from about 28% to about 45%, oil content is from about 30% to about 52%, and the ratio of the animal protein to oil content in said supplementary material is from about 0.55 to about 1.0, said supplementary material providing an absolute quantity of about 4% to about 7.5% of the animal protein to the total protein in the spread.

7. The process of making a peanut spread equivalent to conventional peanut butter in eating quality and of improved protein nutritional value comprising the addition to 100 parts by weight of a conventional peanut butter of 10 to 55 parts of a supplementary material containing less than 5% moisture, an animal protein material in powdered form and containing 30% to 90% animal protein material, and a vegetable oil in amount that the ratio of animal protein to oil in said supplementary material is 0.55 to 1.0, said animal protein material being incorporated in the spread in an amount of about 5 to about 20 parts by weight to 100 parts of the basic peanut butter to provide an absolute quantity of about 4% to about 10% of the animal protein in the total protein in the spread.

8. The process of making a peanut spread of improved eating quality and of improved protein nutritional value comprising the addition to 100 parts by weight of a conventional peanut butter of 10 to 30 parts of a supplementary material containing less than 5% moisture, an animal protein material in finely divided form and containing 30% to 90% animal protein material, and a vegetable oil in amount that the ratio of animal protein to oil in said supplementary material is 0.55 to 1.0, said animal protein material being incorporated in the spread in an amount of about 5 to about 20 parts by weight to 100 parts of the basic peanut butter to provide an absolute quantity of about 4% to about 7.5% of the animal protein to the total protein in the spread.

References Cited by the Examiner

UNITED STATES PATENTS

| | | | |
|---|---|---|---|
| 1,696,766 | 12/28 | Howe | 99—128 |
| 2,911,303 | 11/59 | Rowland et al. | 99—128 |
| 3,037,865 | 6/62 | Lilien et al. | 99—128 |
| 3,056,682 | 10/62 | McOsker | 99—128 X |

OTHER REFERENCES

Freeman et al.: "Peanut Butter," AIC–370, U.S.D.A. Agricultural Research Service, Southern Utilization Research Branch, March 1954, page 19.

A. LOUIS MONACELL, *Primary Examiner.*

BEATRICE H. STRIZAK, *Examiner.*